United States Patent [19]
Kulig et al.

[11] Patent Number: 5,385,019
[45] Date of Patent: Jan. 31, 1995

[54] COMPRESSION RELEASE ENGINE BRAKING METHODS AND APPARATUS FOR USE WITH TURBOCHARGED ENGINES HAVING INTERCOOLERS

[75] Inventors: Frank M. Kulig; Paul J. Spacek, both of Bloomfield, Conn.

[73] Assignee: Jacobs Brake Technology Corporation, Wilmington, Del.

[21] Appl. No.: 193,699

[22] Filed: Feb. 8, 1994

[51] Int. Cl.6 .............................. F02B 29/04
[52] U.S. Cl. ...................................... 60/599
[58] Field of Search ................... 60/599; 123/563

[56] References Cited

U.S. PATENT DOCUMENTS 3,220,392 11/1965 Cummins .
4,296,605 10/1981 Price ........................... 60/599

*Primary Examiner*—Michael Koczo
*Attorney, Agent, or Firm*—Fish & Neave

[57] ABSTRACT

Increased engine braking is available from a system including an internal combustion engine equipped with a compression release engine brake, a turbocharger, and an intercooler by having the engine inlet air compressed by the turbocharger bypass the intercooler during operation of the compression release engine brake.

4 Claims, 2 Drawing Sheets

1

COMPRESSION RELEASE ENGINE BRAKING METHODS AND APPARATUS FOR USE WITH TURBOCHARGED ENGINES HAVING INTERCOOLERS

BACKGROUND OF THE INVENTION

This invention relates to compression release engine braking methods and apparatus for use with turbocharged internal combustion engines having an intercooler between the turbocharger and the intake manifold.

Compression release engine brakes are well known as shown, for example, by Cummins U.S. Pat. No. 3,220,392, which is hereby incorporated by reference herein. Such brakes typically operate by opening the exhaust valves in the associated internal combustion engine near top dead center of the compression strokes of the engine pistons when engine braking is desired. This allows the gas compressed by the engine during its compression strokes to escape to the exhaust system of the engine, thereby preventing the engine from recovering the work of compression during the subsequent expansion strokes of the engine pistons. In effect, the compression release engine brake converts the engine from a power source to a power-sinking gas compressor during engine braking. (The fuel supply to the engine is of course cut off during such braking.) Compression release engine braking is desirable to save wear on the wheel brakes of a vehicle powered by the engine, as well as to increase the safety of operation of the vehicle.

As is well known, many engines are equipped with turbochargers which use the exhaust gases of the engine to spin a turbine. The turbocharger turbine spins a compressor which increases the pressure of the air supplied to the intake manifold of the engine. To prevent the compressed air from arriving at the intake manifold with an undesirably high temperature, an intercooler is often provided between the turbocharger compressor and the intake manifold. The intercooler typically provides a heat exchange between the air compressed by the turbocharger and ambient air to lower the temperature of the compressed air supplied to the intake manifold. Turbochargers and intercoolers allow engines of a given displacement to produce more power with an appropriate increase in injected fuel.

There is a constant demand for more effective compression release engine brakes, i.e., brakes which enable a given engine to produce more braking horsepower. For example, as the power mode power available from an engine increases, it is desirable, if possible, to commensurately increase the braking horsepower available from the engine during operation of an associated compression release engine brake. This is so because a more powerful engine is likely to be used to move heavier loads or to move loads at higher speeds, thereby producing a need for increased engine braking power.

In view of the foregoing, it is an object of this invention to improve the engine braking effectiveness of internal combustion engines equipped with compression release engine brakes, turbochargers, and intercoolers.

SUMMARY OF THE INVENTION

This and other objects of the invention are accomplished in accordance with the principles of the invention by the discovery that in a system which includes an internal combustion engine equipped with a compression release engine brake, a turbocharger, and an intercooler, engine braking can be substantially increased by allowing the engine intake air to bypass the intercooler during operation of the engine brake. Bypassing the intercooler during engine braking allows the intake air compressed by the turbocharger to enter the engine pistons at higher pressure and temperature. Both of these factors increase the engine braking horsepower available from the engine. The engine must do more work during its compression strokes to compress higher pressure and higher temperature intake air. This means that more work is dissipated when the compression release engine brake opens the engine's exhaust valves near the end of the compression strokes. The engine therefore absorbs more energy and provides more braking horsepower.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
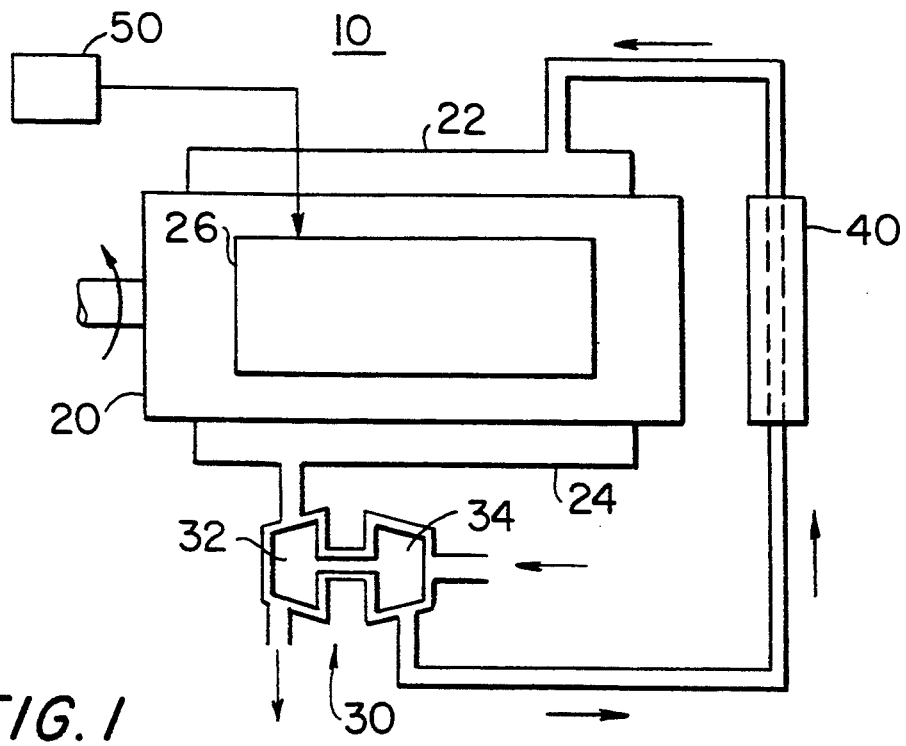
FIG. 1 is a schematic diagram of a typical prior art internal combustion engine equipped with a compression release engine brake, a turbocharger, and an intercooler.

As shown in FIG. 1, a typical prior art system 10 includes an internal combustion engine 20 equipped with a compression release engine brake 26. Engine 20 has an intake manifold 22 and an exhaust manifold 24. Exhaust gas from exhaust manifold 24 is used to spin the turbine 32 of turbocharger 30. Turbine 32 in turn spins turbocharger compressor 34, which compresses inlet air for application to intake manifold 22 via intercooler 40. Compressor 34 inevitably raises the temperature of the inlet air as it compresses that air. Intercooler 40 performs a heat exchange between the compressed inlet air and ambient air to lower the temperature of the compressed inlet air. Although designed to affect inlet air pressure as little as possible, intercooler 40 also unavoidably produces some pressure drop in the inlet air passing through it. While in the depicted embodiment intercooler 40 performs a heat exchange with ambient air, the intercooler could alternatively perform that heat exchange with any other cooling medium such as recirculating liquid engine coolant.

In system 10, when engine braking is desired, control 50 is operated to turn on engine brake 26, which then operates in the conventional manner for such devices. Control 50 also conventionally turns off the fuel supply to engine 20 during operation of brake 26.

Figure 2:
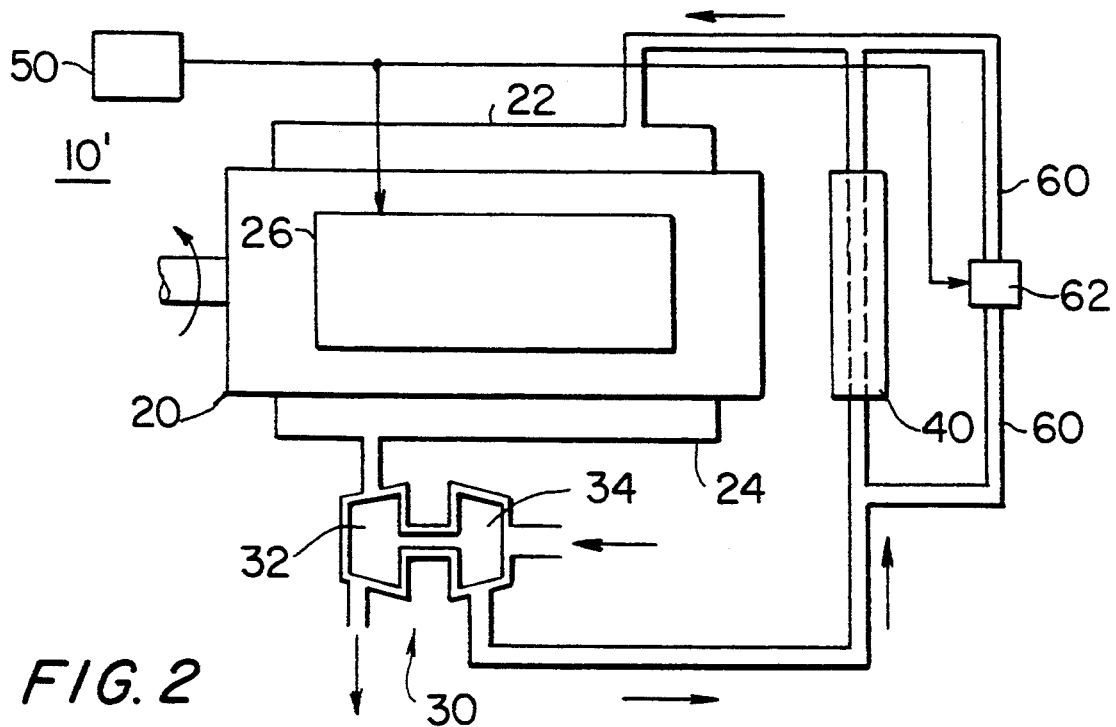
FIG. 2 shows modification of FIG. 1 in accordance with a first illustrative embodiment of the present invention.

As mentioned in the above summary of the invention, we have discovered that more engine braking can be produced by systems of the type shown in FIG. 1 by having the compressed inlet air bypass the intercooler during operation of compression release engine brake 26. In the modified system 10' constructed in accordance with this invention and shown in FIG. 2, for example, conduit 60 bypasses intercooler 40. During power mode operation of system 10' bypass conduit 60 is closed by valve 62 so that all compressed inlet air must flow through intercooler 40 on its way to intake manifold 22. However, when control 50 turns on engine brake 26, it also opens valve 62, thereby allowing most or substantially all of the compressed inlet air to bypass intercooler 40 by flowing through conduit 60. When valve 62 is thus opened, the inlet air prefers to flow through conduit 60 because there is less pressure drop across conduit 60 than there is across intercooler 40. The inlet air which flows through conduit 60 enters engine 20 with higher pressure and temperature, both of which factors increase the compression release engine braking available from the system.

Figure 3:
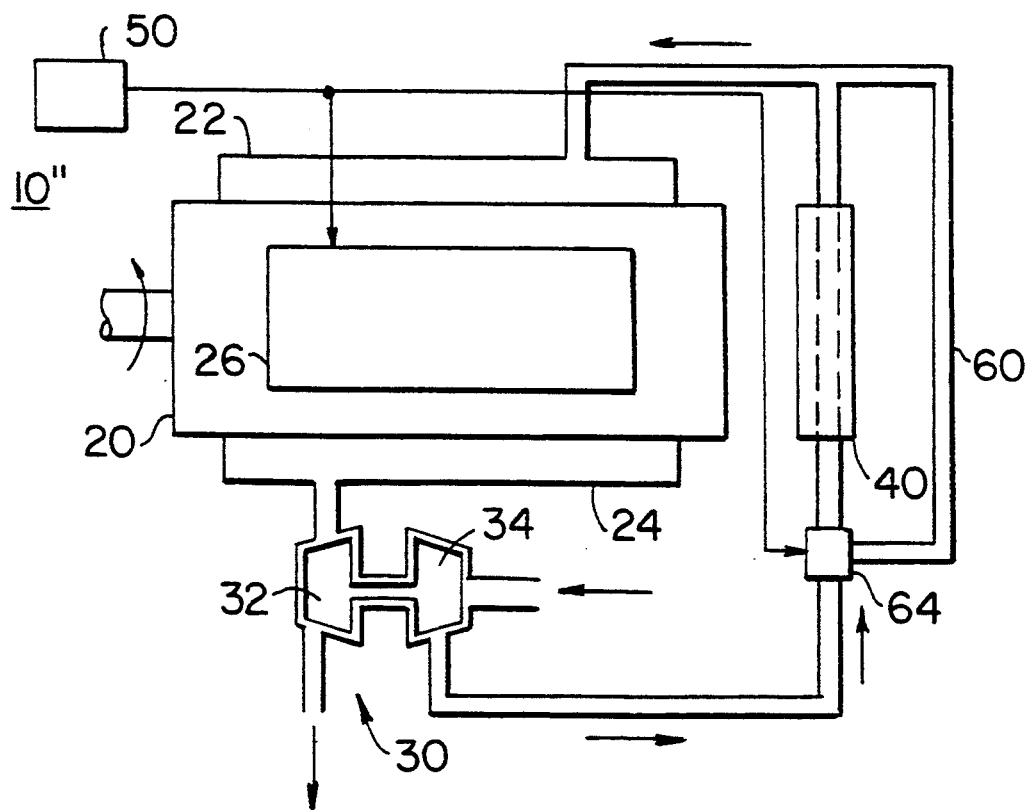
FIG. 3 shows modification of FIG. 1 in accordance with a second illustrative embodiment of the invention.

In the alternative embodiment 10" shown in FIG. 3 a diverter valve 64 is used to direct compressed inlet air to either intercooler 40 (during power mode operation of the system) or to bypass conduit 60 (during compression release engine braking mode operation of the system). Diverter valve 64 therefore positively directs the compressed inlet air to either intercooler 40 (while closing off bypass conduit 60) or to bypass conduit 60 (while closing off the passage to intercooler 40). In other respects the alternative embodiment shown in FIG. 3 operates in the same manner described above for FIG. 2.

It will be understood that the foregoing is only illustrative of the principles of this invention, and that various modifications can be made by those skilled in the art without departing from the scope and spirit of the invention. For example, intercooler 40 in FIG. 2 or FIG. 3 can perform an air to engine coolant liquid heat exchange rather an than air to air heat exchange as is assumed in the foregoing discussion.

The invention claimed is:

1. Compression release engine braking apparatus for an internal combustion engine equipped with a turbocharger and an intercooler, the turbocharger compressing the air supplied to an intake manifold of the engine and the intercooler reducing the temperature of the compressed air before it is supplied to the intake manifold, comprising:

means for diverting at least some of the air compressed by the turbocharger around the intercooler to the intake manifold to reduce the amount by which the intercooler reduces the temperature of the compressed air supplied to the intake manifold when engine braking is in operation.

2. The apparatus defined in claim 1 wherein said means for diverting comprises:

a conduit which bypasses the intercooler between the turbocharger and the intake manifold;

a valve for normally closing said conduit; and means for opening said conduit when engine braking is in operation.

3. The apparatus defined in claim 1 wherein said means for diverting comprises:

a conduit which bypasses the intercooler between the turbocharger and the intake manifold; and a diverter valve for substantially closing either said conduit when engine braking is not in operation or the compressed air passageway through the intercooler when engine braking is in operation.

4. The method of operating an internal combustion engine equipped with a compression release engine brake, a turbocharger for compressing the air supplied to an intake manifold of the engine, and an intercooler for reducing the temperature of the compressed air before it is supplied to the intake manifold, said method comprising the step of:

reducing the amount by which the intercooler reduces the temperature of the compressed air supplied to the intake manifold during operation of the compression release engine brake by diverting at least some of the air compressed by the turbocharger around the intercooler during operation of the compression release engine brake.

* * * * *